United States Patent [19]

Chaffee et al.

[11] 4,175,800

[45] Nov. 27, 1979

[54] FLUID BEARING SUPPORTING SYSTEM FOR ROTARY DRUMS AND THE LIKE

[75] Inventors: David H. Chaffee, Neenah; Earl L. Tipler, Winnecone, both of Wis.

[73] Assignee: Overly, Inc., Neenah, Wis.

[21] Appl. No.: 867,792

[22] Filed: Jan. 9, 1978

[51] Int. Cl.² .................................. F16C 32/06
[52] U.S. Cl. ........................................ 308/9; 308/77
[58] Field of Search ............... 308/9, 73, 15, 76, 77, 308/78, 74–75, DIG. 1, 203–204, DIG. 12, 121, 122

[56] References Cited

U.S. PATENT DOCUMENTS

| | | | |
|---|---|---|---|
| 2,606,081 | 8/1952 | Moller | 308/73 |
| 3,374,863 | 3/1968 | Kozlowski et al. | 308/121 X |
| 3,710,570 | 1/1973 | Audiffred et al. | 308/121 X |
| 4,032,199 | 6/1977 | Jenness | 308/73 |

Primary Examiner—Douglas C. Butler
Attorney, Agent, or Firm—Andrus, Sceales, Starke & Sawall

[57] ABSTRACT

A large diameter rotary drum is horizontally supported upon a plurality of saddle like expansible liquid bearing pads of large effective contact area with the drum, and a fixed saddle adjacent each bearing saddle supports the drum when not floated upon the bearings. The bearings and the lower portion of the drum resting thereon are submerged in the liquid in a sump which is kept at a given temperature by passing the liquid therefrom to a cooling tower or through a heat exchanger. Separate adjustable values supply the activating liquid to each bearing pad and a separate pressure gage is provided between each valve and its associated pad.

13 Claims, 7 Drawing Figures

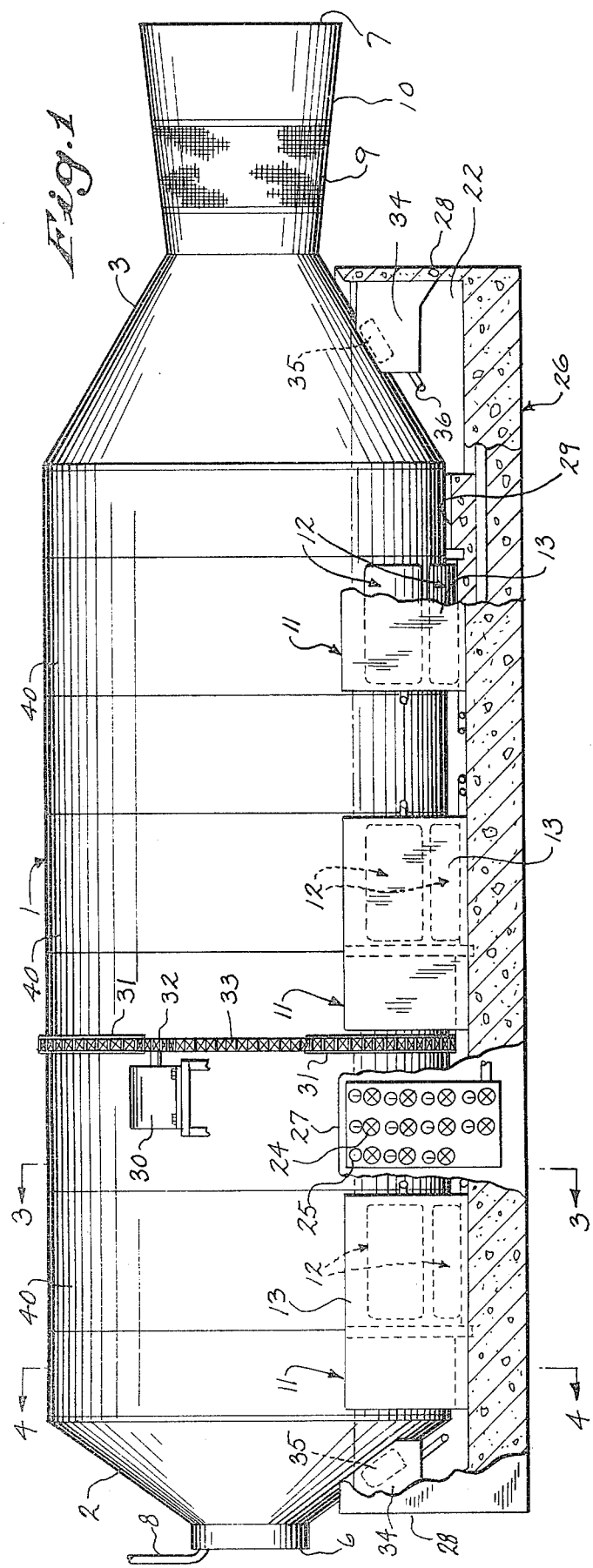
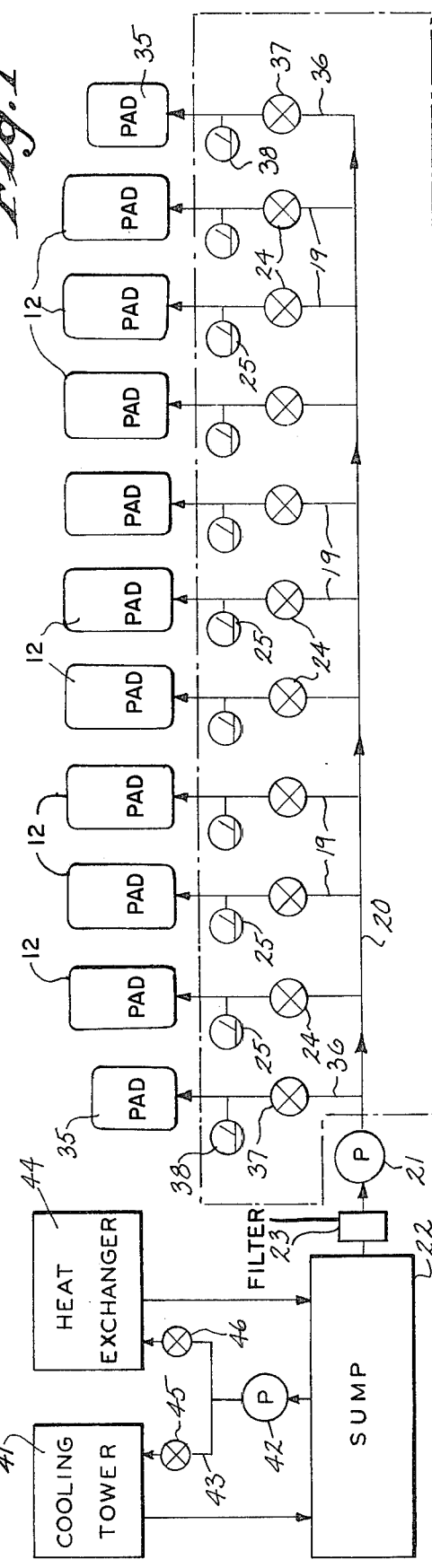

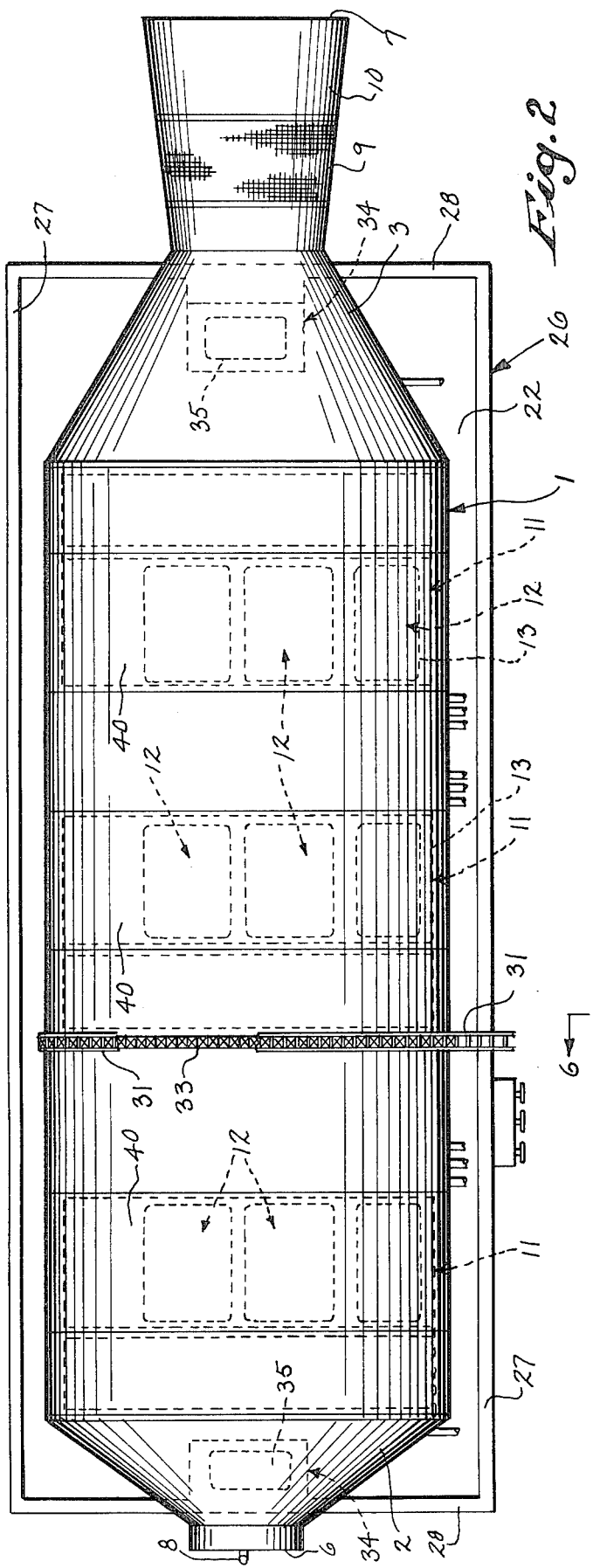
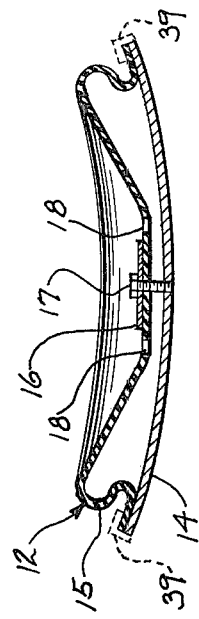
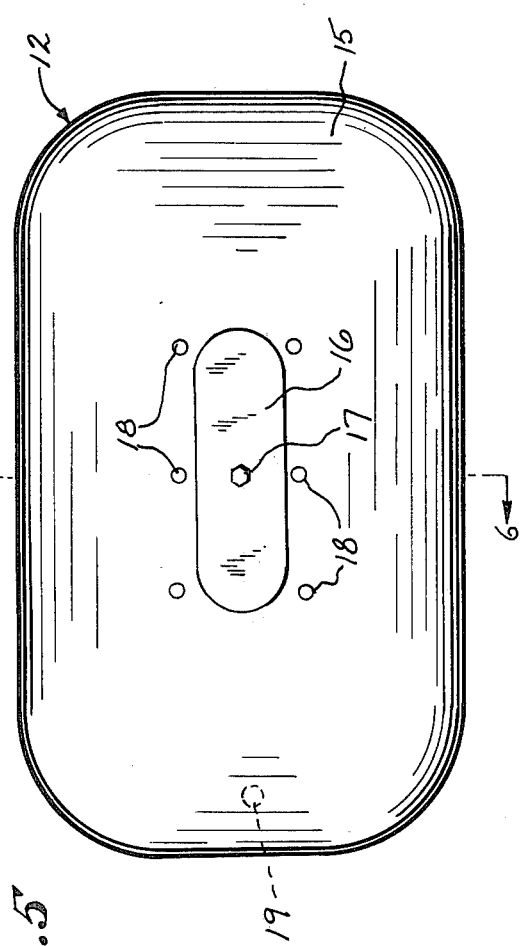
Fig. 2
Fig. 5
Fig. 6

FLUID BEARING SUPPORTING SYSTEM FOR ROTARY DRUMS AND THE LIKE

BACKGROUND OF THE INVENTION

This invention relates to a fluid bearing supporting system for rotary drums and the like.

It has been known to support generally horizontally disposed rotary drums by means of saddle-like liquid bearing shoes engaging end trunnions or circumferential riding rings.

In such instances the trunnions or riding rings have to be machined very accurately to a true cylindrical support surface which is very costly for large diameter drums of the order of ten to twenty feet in diameter.

Attempts have been made to float the shoes hydraulically to accomodate out of roundness of the trunnion or riding ring and avoid undue wear upon the shoes.

In all instances, however, the bearing areas have been small, generally employing the liquid bearing shoes as a substitute for roller contact supports, and which required a very substantial pressure for the liquid employed in the bearing support.

Furthermore, both the trunnions and the riding rings generally had to be made by forging and were extremely expensive for the larger diameters.

SUMMARY OF THE INVENTION

The liquid bearings employed in carrying out the present invention are constructed as expandable pads of large area mounted on a saddle support to bear directly against the drum or other object being supported.

By reason of the large effective area of support provided by the pads the liquid is normally operative to lift the drum at a pressure generally less than 50 P.S.I.

A pump supplies the liquid from a sump to the several pads through a manifold and individual branch conduits having individual control valves and a pressure gage indicating operation of the corresponding pad.

The pads, and lower part of the drum are submerged in the sump at all times thereby eliminating uncontrolled water spray from the bearings and providing a heat exchange means that is desirable in some usages.

The expandable pads can accomodate substantial out of roundness of the drum, but where the surface of the drum may be quite irregular, a circumferential band of stainless steel sheet material may be applied to the drum in the region of effective contact by the pads to increase the efficiency of the system.

BRIEF DESCRIPTION OF THE DRAWINGS

The best mode presently contemplated by the applicant for carrying out the invention is illustrated in the accompanying drawings in which:

FIG. 1 is a side elevation of a shake-out drum supported for rotation upon liquid bearings and with parts broken away and sectioned to show details of the support;

FIG. 2 is a top plan view of the structure shown in FIG. 1 and with parts of the drive broken away and sectioned;

FIG. 5 is a plan view of a pad;

FIG. 6 is a transverse section of the pad taken on line 6—6 of FIG. 5; and

FIG. 7 is a schematic showing of the liquid supply system and controls.

DESCRIPTION OF THE PREFERRED EMBODIMENT

Figure 3:
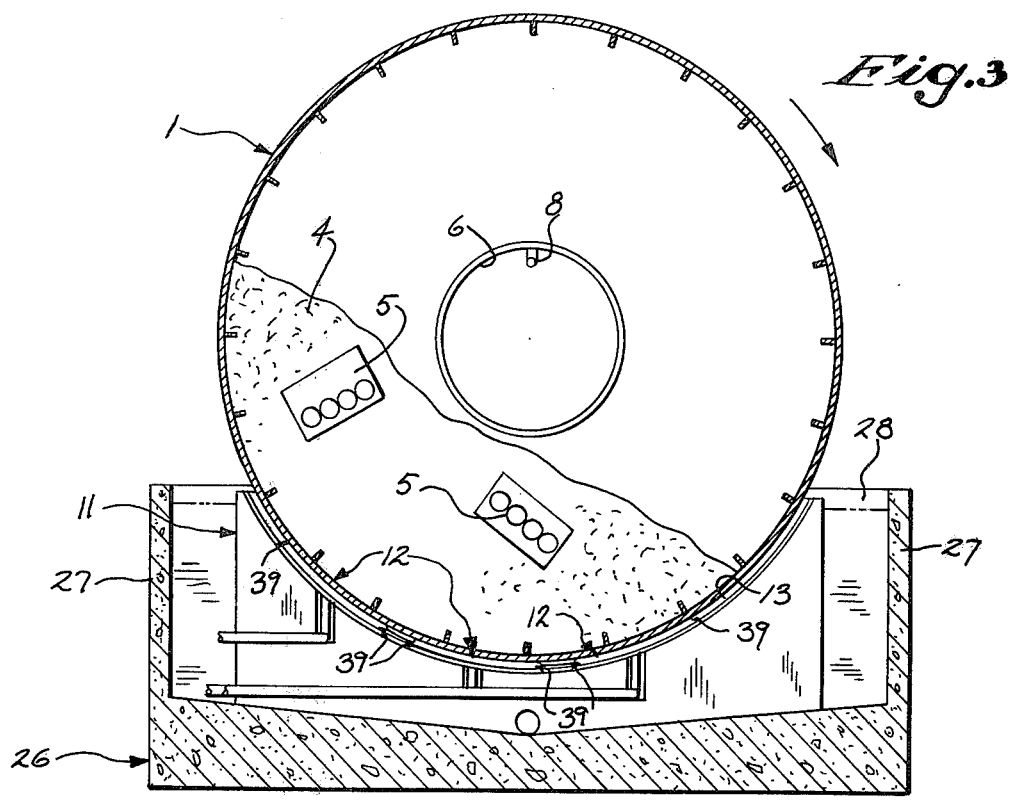
FIG. 3 is a transverse section taken on Line 3—3 of FIG. 1 showing the pads.

Referring to the drawings, the rotary drum 1 is generally cylindrical with conical ends 2 and 3.

The drum 1 may have various detail construction for various uses, that illustrated being a shake-out drum for use in metal foundries for the purpose of removing the sand 4 from castings 5.

Such shake-out drums generally have a diameter of the order of 18 feet, with an inlet opening 6 of approximately 5 feet in diameter axially of end head 2, and an outlet opening 7 of approximately 6 and one-half feet in diameter axially of the end head 3.

Figure 4:
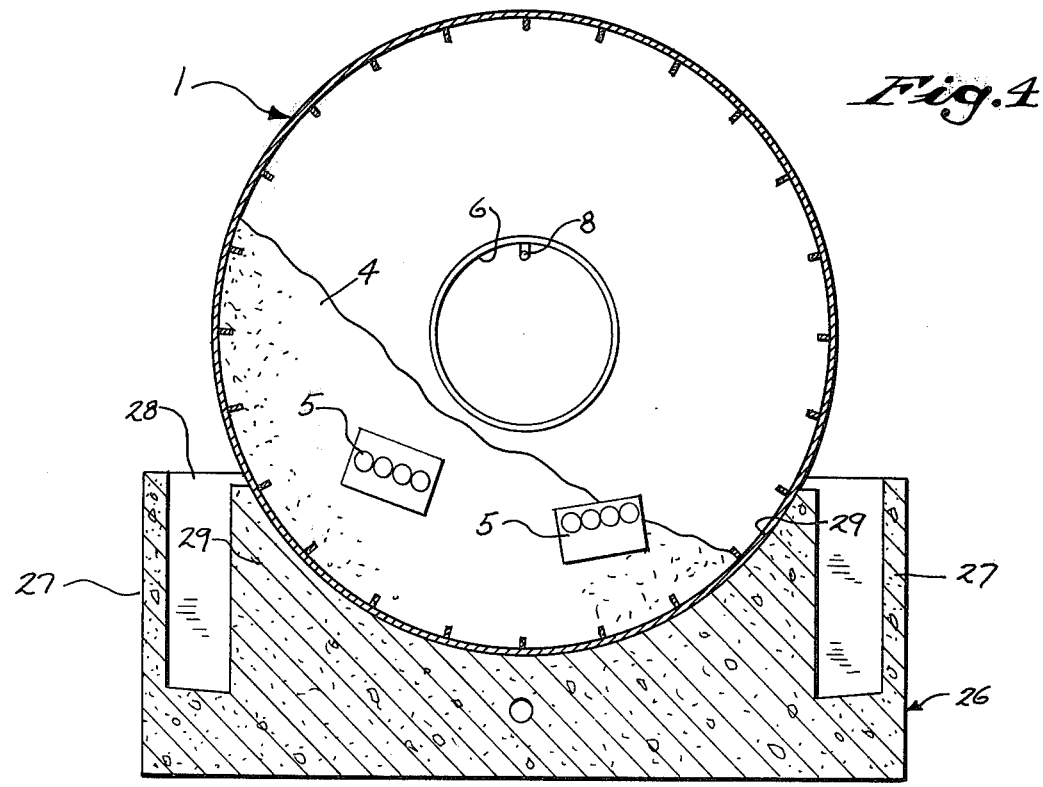
FIG. 4 is a transverse section taken on Line 4—4 of FIG. 1 showning the parking saddle.

The shake-out drum is mounted generally horizontally to rotate about 2 R.P.M. thereby causing the contents, consisting of castings and loose sand to tend to rise on the side of the drum that is moving upwardly and then to tumble down hill at a given angle to a lower position on the side that is moving downwardly, as illustrated in FIGS. 3 and 4. During this tumbling of the castings the sand is loosened from them and the loose sand becomes abrasive and tends to polish the castings.

For this purpose it is generally desirable to moisten the sand and it is customary to supply a constant flow of water through a hose 8 suspended in the inlet opening 6, the volume of water supplied depending upon the needs of the particular sand and the through-put of castings and sand.

By having outlet 7 of greater diameter than inlet 6 the contents of the drum continuously work toward the outlet 7 and are discharged therethrough.

The sand 4 and castings 5 are separated during discharge through outlet 7 as by a tapered screen 9 and a tapered frusto conical member 10. As the discharged sand and castings move through outlet 7 and through the screen 9 the sand drops through the screen and the castings continue through member 10 to fall from the outer end thereof preferably onto a conveyor, not shown.

Shake-out drums, when loaded, may weigh many tons and it is not practical to support them for rotation by end trunnions upon relatively small diameter bearings. Heretofore such drums have been supported on a plurality of single piece forged and machined circumferential riding rings which ride upon longitudinally spaced sets of idler rollers arranged in saddle formation on a foundation. The riding rings tended to reinforce the shell of the drum, and depending upon the space between riding rings, additional stiffening rings have been employed intermediate the riding rings to prevent undue distortion of the shell. Any shell distortion generally resulted in improper tracking between the riding rings and rollers with consequent increased friction and wear, as well as requiring greater power for rotation of the drum.

In carrying out the present invention, a plurality of longitudinally spaced sets of water bearings 11 arranged in saddle formation support directly the shell of drum 1.

In the construction illustrated there are three sets 11 of water bearings, each comprising a plurality of large area water bearing pads 12 arranged upon a saddle foundation 13 as shown in the drawing.

Each water bearing pad 12 comprises an expandable pad made up of a curved backing 14 lying upon the upper curved face of the saddle 13, and a flexible pillow 15 generally of Neoprene impregnated with nylon and secured and sealed to said backing around its periphery.

The pillow 15 is constructed at its periphery as a bellows to provide for expansion upwardly under internal fluid pressure.

The central area of the pillow 15 is retained against freely lifting away from backing 14 when internal fluid pressure is applied, as by a retaining plate 16 tied by stud 17 to backing 14.

A plurality of holes or passages 18 are provided either in plate 16 or in the pillow 15 as shown in the drawing to discharge liquid from inside the pillow to the space above the latter.

Each pillow 15 is supplied with water or other suitable liquid by a conduit 19 leading from a manifold 20 which in turn is supplied by pump 21 drawing water from sump 22 through filter screen 23, as shown in FIG. 7.

A manual control valve 24, preferably a needle valve, is provided in each conduit 19 to control the flow of liquid to the corresponding pillow 15.

A pressure gage 25 or other suitable means is additionally provided in each conduit 19 between the valve 24 and pillow 15 to provide preferably a visual indication of operation of the corresponding water bearing.

For a drum 1 of the size indicated, i.e. over sixty feet in length and approximately eighteen feet in diameter, each liquid bearing pad may be generally rectangular and in excess of three by five feet in linear dimensions.

Each bearing saddle 13 supports three bearing pads arranged as indicated in FIGS. 2 and 3 with each pad extending lengthwise of the drum and with the pads spaced apart circumferentially of the drum beneath the same for supporting it.

Due to the mass of the contents of the drum generally rising and predominating on the side of the drum that is moving upwardly during drum rotation, the bearing pads 12 are generally offset toward that side by about 10°, as shown in FIG. 3.

In the construction illustrated, there are three sets of bearing pads 12 upon three corresponding saddles 13 spaced longitudinally of drum 1 upon a foundation 26.

The foundation 26 has upstanding sides 27 and ends 28 to provide the sump 22 generally submerging the bearing pads 12 and the lower portion of the drum 1.

Adjacent each saddle 13 and preferably formed therewith upon the foundation 26 is a parking saddle 29 which rises sufficiently above the surface of saddle 13 to support the drum when not rotating, clear of the then collapsed pads 12.

Before rotating the drum, the pads 12 are expanded by supplying the operative water pressures, thus lifting the drum free of the parking saddles and supporting the drum for free substantially frictionless rotation.

The drum 1 is rotated by any suitable means such as the motor 30 and a chain or belt 31 connecting the output sheave 32 of the motor to the corresponding driven sheave 33 on the drum.

Where, as shown in the drawings, there are three sets of bearings 11, each with a parking saddle 29, the drive sheave 33 for drum 1 is preferably located adjacent the central parking saddle on the opposite side from the central bearing.

In order to maintain the longitudinal position of the drum when it is floating on bearings 11, one or more water bearings 34 are carried by each end 28 of the foundation, to operate against the corresponding frusto conical end 2 or 3 and prevent longitudinal displacement of the drum in a direction against the bearing.

Bearings 34 are constructed on the same principle as support bearings 11, each having an expansible bearing pad 35 generally mounted and shaped to conform to the opposed end surface of the drum and connected by conduit 36 to the manifold 20 for supply of water thereto.

In operation when the drum 1 is floating on bearings 11, the bearings 34 at the opposite ends of the drum are opposing each other and effect an intermediate positioning of the drum.

Each conduit 36 has a valve 37 therein to control the flow of pressure fluid to the corresponding bearing pad 35, and a pressure gage 38 to indicate the operation of the pad.

One of the features of the present invention is to provide a large total area of floating support of the drum 1 upon the several supporting bearings 11. For this purpose, with drums generally weighing several tons when loaded, the total area of fluid pressure support should be sufficient to require generally less than 50 pounds per square inch in the pads 12 in order to float the drum for rotation.

It has been found practical to construct individual pads 12 somewhat in excess of three feet by five feet in size.

The individual pads 12 are mounted on saddle 13 by sliding the same longitudinally onto the saddle with the side edges of backing 14 engaging beneath flanged ribs 39 extending across the face of the saddle.

The space between saddles 13 is generally such as to amply provide for insertion of the pads 12 and for removal and replacement of any individual pad should one become defective.

The pads 12 and 35 are capable of adjusting their individual expansion to accomodate substantial variations in the surface of drum 1, and it is not necessary to provide an accurately machined surface such as a riding ring for the drum. However, where the drum has welds or ridges of any kind in the surface that might engage a pad 12 or 35, it is best to grind the same smooth to avoid possible contact with the surface of the pad.

If desired, in order to conserve on water, a band of sheet stainless steel 40 may be applied to the drum to encircle the same in the area of bearing contact and provide a smoother surface for more efficient and uniform support by the pad.

The pads 12 and 35 are capable of accomodating general out of roundness of the drum without undue distortion of the latter.

When it is desired to start rotation of the drum, the pump 21 is first started to supply water through manifold 20 and conduits 19 to pads 12, and conduits 36 to pads 35.

At this time the operator checks each gage 25 and 38 to make sure the drum is properly lifted and centered and that each water bearing pad is functioning to lend its proportionate support to the drum. In general, the water pressure in each pad 12 and 35 will be the same and when it becomes sufficient to lift the drum by expansion of the pad, the needle for each gage will start to fluctuate or wiggle, thus indicating that the corresponding pad is functioning by a flow of water outwardly from the pad through the finite escape space between the pad and the drum at the general periphery of the pad pillow.

In the event a pad is not properly functioning, the corresponding valve 24 or 37 may be adjusted to increase the flow of water to the pad.

In the event a pad leaks the corresponding valve can be shut and the pad removed and replaced by another, which is then put upon stream by opening the valve until it functions properly as indicated by the customary wiggling of the needle of the gage.

Where the drum is employed as a shake-out drum the hot castings 5 will heat the drum and the water in sump 22.

The water in the sump 22 may be cooled as by circulating the same through a cooling tower 41 by means of a pump 42 and suitable conduits 43.

Where in the winter space heating is needed the hot water from sump 22 may be circulated through a heat exchanger 44 by the pump 42 and the cooling tower 41 may be disconnected by a valve 45 properly located in conduit 43.

A similar valve 46 shuts off the circulation through heat exchanger 44 when it is desired to use the cooling tower 41.

The invention is applicable to the support of rotating drums of all types and in many usages. In some instances because of the large area of uniform support it is possible to construct a drum of less wall thickness and weight without consequent distortion of the drum.

Furthermore, the support eliminates the problems heretofore encountered because of possible misalignment of mechanical bearings and of bearing wear.

The power requirements for rotating the drum are greatly reduced by floating the drum on liquid bearings. For instance, a water bearing providing the same lift as an air bearing requires only about one-eighth the power and the power required to rotate the drum is only a small fraction of the power required when mechanical bearings are employed.

Various modes of carrying out the invention are contemplated as being within the scope of the following claims, particularly pointing out and distinctly claiming the subject matter which is regarded as the invention.

I claim:

1. The method of supporting a generally horizontally disposed cylindrical drum for rotation comprising lifting the drum by contact therewith of a liquid under pressures generally less than 50 P.S.I. over an area correlated to the weight of the drum, and floating the drum upon said liquid out of other physical support contact.

2. A supporting system for a generally cylindrical drum comprising fixed parking saddle means supporting the drum in stationary position, hydraulic fluid bearing means to lift the drum free of contact with said saddle means and to float the same out of contact with any physical support, and means to rotate the drum while thus floating, said fluid bearing means comprising a plurality of expansible pads of large face area emitting liquid in direct fluid contact with the drum over the large face area of the pads at a pressure less than approximately 50 P.S.I.

3. The supporting system of claim 2 in which said pads are arranged in sets upon longitudinally spaced saddles of generally less height than said parking saddles, manifold means for supplying liquid to said pads, valve means individually controlling the supply of liquid from said manifold means to each said pad, and means to indicate actuation of each said pad in floating said drum.

4. The supporting system of claim 2 and means to submerge said hydraulic fluid bearing means and the lower portion of said drum in the liquid of said bearing means.

5. The supporting system of claim 4 in which said submerging means constitutes a sump and pump means having its inlet connected through a filter to said sump and its outlet connected to said fluid bearing means to operate the latter.

6. The supporting system of claim 4 and heat exchange means connected to said submerging means to control the temperature of the liquid therein.

7. The supporting system of claim 5 and heat exchange means connected to said sump to control the temperature of the liquid therein.

8. The supporting system of claim 2 and a fluid bearing engaging each end head of the drum to maintain the longitudinal position of the drum during rotation.

9. The supporting system of claim 2 in which said expansible pads collapse generally clear of the drum when the latter rests upon said fixed saddle means.

10. The supporting system of claim 2 and a sheet stainless steel band encircling the drum in the path of fluid contact with the drum from said bearing means during rotation of the drum.

11. The supporting system of claim 2 in which water is employed for actuation of said hydraulic fluid bearing means.

12. A supporting system for a generally cylindrical drum during rotation, comprising a plurality of expansible water bearing pads disposed beneath the drum at circumferentially and longitudinally spaced locations, a sump submerging said bearings and the lower portion of the drum in water, and means to supply each said pad with a continuous flow of water from said sump at a pressure generally less than 50 P.S.I. to float the drum upon said pads out of contact with other physical support, said pads discharging spent liquid directly into the water of said sump.

13. The system of claim 12 in which said supply means comprises a pump having its inlet connected with said sump, a manifold receiving water from said pump and directing the same through individual connections to each said pad, a valve in each of said connections to adjust and determine the flow of water to the corresponding pad, and a pressure gauge for each connection between the corresponding valve and pad to indicate actuation of the pad.

* * * * *